(12) United States Patent
Liu

(10) Patent No.: US 12,425,129 B2
(45) Date of Patent: Sep. 23, 2025

(54) INFORMATION TRANSMISSION METHOD AND APPARATUS, AND COMMUNICATION DEVICE

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 352 days.

(21) Appl. No.: 18/250,922

(22) PCT Filed: Oct. 29, 2020

(86) PCT No.: PCT/CN2020/124924
§ 371 (c)(1),
(2) Date: Apr. 27, 2023

(87) PCT Pub. No.: WO2022/087980
PCT Pub. Date: May 5, 2022

(65) Prior Publication Data
US 2024/0007217 A1 Jan. 4, 2024

(51) Int. Cl.
H04L 1/00 (2006.01)
(52) U.S. Cl.
CPC ................. *H04L 1/0026* (2013.01)
(58) Field of Classification Search
None
See application file for complete search history.

(56) References Cited

U.S. PATENT DOCUMENTS

| 12,074,821 | B2* | 8/2024 | He | H04W 48/10 |
| 2017/0005764 | A1* | 1/2017 | Park | H04W 8/005 |
| 2017/0048734 | A1* | 2/2017 | Kusashima | H04W 16/32 |
| 2017/0105112 | A1* | 4/2017 | Park | H04L 5/0035 |
| 2019/0150059 | A1 | 5/2019 | Vajapeyam et al. | |
| 2020/0229093 | A1* | 7/2020 | Ahmad | H04W 52/0209 |
| 2020/0322807 | A1* | 10/2020 | Si | H04W 88/10 |
| 2021/0007072 | A1* | 1/2021 | Wu | H04W 72/53 |
| 2021/0051485 | A1* | 2/2021 | Lin | H04W 56/001 |
| 2021/0282079 | A1* | 9/2021 | Wu | H04L 5/005 |
| 2021/0297212 | A1* | 9/2021 | Zhang | H04W 56/00 |
| 2021/0306863 | A1* | 9/2021 | Wu | H04W 16/14 |

(Continued)

FOREIGN PATENT DOCUMENTS

| CN | 110249582 A | 9/2019 |
| CN | 110336655 A | 10/2019 |

(Continued)

OTHER PUBLICATIONS

"Initial access procedure for NR-U," Proceedings of the 3GPP TSG RAN W61 #99, Sharp, R1-1912765, Nov. 8, 2019, Reno, Nevada, 8 pages.

(Continued)

*Primary Examiner* — Otis L Thompson, Jr.
(74) *Attorney, Agent, or Firm* — McCoy Russell LLP

(57) ABSTRACT

An access network device configures a length of a discovery reference signal (DRS) transmission window in different scenarios, a quasi co-located (QCL) parameter is determined according to the length of the DRS transmission window, and then the access network device sends the QCL parameter to user equipment.

20 Claims, 5 Drawing Sheets

(56) References Cited

U.S. PATENT DOCUMENTS

| | | | | |
|---|---|---|---|---|
| 2021/0337490 A1* | 10/2021 | Shen | .................... | H04W 56/001 |
| 2021/0385864 A1* | 12/2021 | Wu | ...................... | H04W 74/006 |
| 2022/0015049 A1* | 1/2022 | Shen | ........................ | H04L 5/005 |
| 2022/0095253 A1* | 3/2022 | Harada | ................. | H04W 56/00 |
| 2022/0124725 A1* | 4/2022 | Lin | ........................ | H04L 5/0082 |
| 2022/0124807 A1* | 4/2022 | Hu | ....................... | H04W 74/006 |
| 2022/0256604 A1* | 8/2022 | Zhang | ................... | H04L 5/0053 |
| 2022/0345269 A1* | 10/2022 | Alriksson | ......... | H04W 74/0808 |
| 2023/0292262 A1* | 9/2023 | Pan | ................... | H04W 56/0015 |

FOREIGN PATENT DOCUMENTS

| | | |
|---|---|---|
| CN | 110945942 A | 3/2020 |
| CN | 111147201 A | 5/2020 |
| WO | 2020145497 A1 | 7/2020 |

OTHER PUBLICATIONS

"RA procedure considering SSBs with QCL relationship," Proceedings of the 3GPP TSG-RAN WG2 Meeting #109 electronic, Fujitsu, R2-2000771, Feb. 24, 2020, Elbonia, 3 pages.

\* cited by examiner

INFORMATION TRANSMISSION METHOD AND APPARATUS, AND COMMUNICATION DEVICE

CROSS REFERENCE TO RELATED APPLICATION

The present application is a U.S. National Phase of International Application No. PCT/CN2020/124924 entitled "INFORMATION TRANSMISSION METHOD AND APPARATUS, AND COMMUNICATION DEVICE," and filed on Oct. 29, 2020. The entire contents of the above-listed application are hereby incorporated by reference for all purposes.

BACKGROUND

In radio communication systems, devices are allowed to use unlicensed frequency bands for communication. Due to possible occupation of resources by other devices in the case of the unlicensed frequency bands, design of a discovery reference signal (DRS) for cell identification, synchronization and radio resource management (RRM) measurement is needed.

SUMMARY

An example of a first aspect of the disclosure provides an information transmission method. The information transmission method is performed by an access network device, and includes:

determining a quasi co-located (QCL) parameter, where the QCL parameter is configured to indicate a length of a discovery reference signal (DRS) transmission window configured under sub-carrier space adopted by a synchronization signal block (SSB); and sending indication information, wherein the indication information is configured to indicate the QCL parameter.

An example of a second aspect of the disclosure provides an information transmission method. The information transmission method is performed by user equipment, and includes:

receiving indication information of a quasi co-located (QCL) parameter sent by an access network device; and determining, according to the indication information of the QCL parameter, a length of a discovery reference signal (DRS) transmission window configured under sub-carrier space adopted by a synchronization signal block (SSB).

Additional aspects and advantages of the disclosure will be partially set forth in the following description, which will become apparent in the following description, or may be learned by practice of the disclosure.

BRIEF DESCRIPTION OF THE DRAWINGS

The above and/or additional aspects and advantages of the disclosure will be apparent and easy to understand from the following description of examples made in conjunction with accompanying drawings. In the figures.

DETAILED DESCRIPTION

Figure 1:
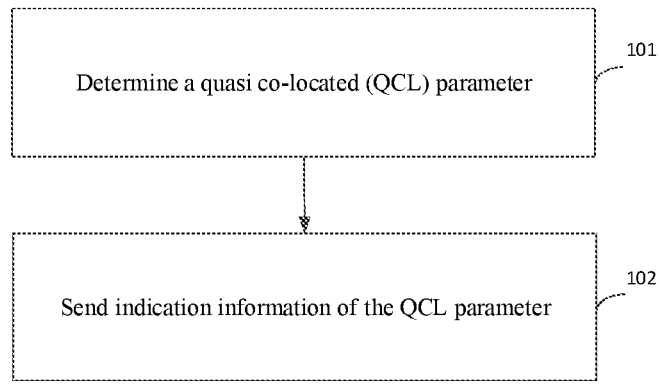
FIG. 1 is a schematic flowchart of an information transmission method according to an example of the disclosure.

Examples will be described in detail here, and instances of which are shown in accompanying drawings. When the following description involves the accompanying drawings, the same numbers in different accompanying drawings represent the same or similar elements unless otherwise indicated. Embodiments described in the following examples do not represent all embodiments consistent with examples of the disclosure. On the contrary, these embodiments are merely instances of apparatuses and methods consistent with some aspects of the examples of the disclosure as detailed in the appended claims.

Terms used in the examples of the disclosure are merely used for describing specific examples rather than limiting the examples of the disclosure. As used in the examples and the appended claims of the disclosure, the singular forms such as "a", "an" and "this" are also intended to include plural forms, unless otherwise clearly stated in the context. It should also be understood that the term "and/or" used here refers to and includes any or all possible combinations of one or more associated listed items.

It should be understood that although terms such as first, second and third can be used in the examples of the disclosure to describe different types of information, the information should not be limited to these terms. These terms are merely used to distinguish the same type of information from each other. For example, first information can be referred to as second information, and similarly, second information can be referred to as first information, without departing from the scope of the examples of the disclosure. Depending on the context, the words "if" and "as if" as used here can be interpreted as "at the time of" or "when" or "in response to determining".

The examples of the disclosure are described in detail below, and instances of the examples are shown in the accompanying drawings, throughout which identical or similar reference numerals indicate identical or similar elements. The examples described below with reference to the accompanying drawings are illustrative and are merely used to explain the disclosure, but cannot be construed as limitation to the disclosure.

The disclosure relates to the technical field of radio communication, in particular to an information transmission method and apparatus, and a communication device.

Radio frames of a new radio (NR) system of a 3rd generation partnership project (3GPP) are each divided into 10 sub-frames with the same length of 1 ms, and each sub-frame may include a plurality of slots according to different sub-carrier space. Each slot consists of a certain number of symbols, and the number of symbols is determined by a type of cyclic prefix (CP). The NR system supports sending of a multi-beam synchronization signal (SS), a secondary synchronization signal and a physical broadcast channel (PBCH). A synchronization signal block (SSB) (also referred to as SS/PBCH block) usually occupies four orthogonal frequency division multiplexing (OFDM) symbols, and its position in a transmission window is related to the sub-carrier space (SCS) and the number L of beams.

In a time domain, four OFDM symbols occupied by one SSB include: one symbol of a primary synchronization signal (PSS), one symbol of a secondary synchronization signal (SSS) and two symbols of PBCH. In the SSB, the symbols are numbered from 0 to 3 in an ascending order. In a frequency domain, one SSB occupies 24 continuous resource blocks (RB). Each RB includes 12 sub-carriers, and the sub-carriers in the above 24 RBs are numbered from 0 to 287 in an ascending order, starting with an RB with a lowest number. For the PSS and the SSS, a resource is mapped to a middle $127^{th}$ sub-carrier. For the PBCH, a resource is mapped to a $288^{th}$ sub-carrier. The PSS, the SSS and the PBCH have the same cyclic prefix (CP) length and sub-carrier space (SCS).

In an unlicensed frequency band not higher than 52.6 GHz, a configuration solution for a synchronization signal block (SSB) is designed, including a beam indication mode of the SSB and a solution for setting SSB candidate positions in a DRS transmission window. However, further design of SSB configuration is needed in a frequency band from 52.6 GHz to 71 GHz or even higher level.

Higher SCS is adopted for a frequency band from 52.6 GHz to 71 GHz compared with SCS for a frequency band below 52.6 GHz, and the SCS may be configured as 60 KHz, 120 KHz, 240 KHz, 480 KHz, and peak 960 KHz. When the sub-carrier space is 120 KHz, if a length of the DRS transmission window remains 5 ms, since the DRS transmission window is fully occupied in the case of an unlicensed frequency band, no SSB candidate transmission position, that is, SSB candidate position, is reserved. Thus, it is necessary to configure the length of the DRS transmission window according to different scenarios. Besides, since the length of the DRS transmission window is not constant, it is necessary to design a way to indicate the length of the DRS transmission window in the SSB.

An information transmission method and apparatus, a communication device and a storage medium according to the disclosure will be described below in detail with reference to the accompanying drawings.

FIG. 1 is a schematic flowchart of an information transmission method according to an example of the disclosure, and the method according to this example is executed by an access network device.

The access network device is deployed in a radio access network for providing a radio access function for user equipment. The access network device may be a base station (BS). The access network device may perform radio communication with the user equipment via one or more antennas. The access network device may provide communication coverage for its geographical area. The base station may include different types, such as a macro-base station, a micro-base station, a relay station and an access point. In some examples, the base station may be referred to by those skilled in the art as a base station transceiver, a radio base station, an access point, a radio transceiver, a basic service set (BSS), an extended service set (ESS), node B (NodeB), evolved node B (eNB or eNodeB) or some other appropriate terms. Illustratively, in a 5G system, the base station is referred to as gNB. For the convenience of description, in the example of the disclosure, the above apparatuses providing a radio communication function for the user equipment are collectively referred to as the access network device.

The access network device and the user equipment may communicate with each other through air interface technology. With the increase of traffic, especially in some urban areas, a licensed frequency band may not satisfy the demand of traffic easily, so in the related art, the unlicensed frequency band is used for data transmission between the access network device and the user equipment, so as to satisfy greater traffic demand.

The unlicensed frequency band is a frequency band divided, by the country and regions, to be used for radio device communication. This frequency band is usually considered as a shared frequency band, that is, communication devices in different communication systems may use this frequency band as long as the communication devices satisfy regulatory requirements on this frequency band set by the country or regions, and there is no need to apply for exclusive frequency band authorization to the government. The unlicensed frequency band may also be referred to by those skilled in the art as a shared frequency band, an unlicensed frequency spectrum, a license-free frequency band, a license-free frequency spectrum, a shared frequency band, a freely-licensed frequency band, a freely-licensed frequency spectrum or some other appropriate terms.

As shown in FIG. 1, information transmission method includes:

Step 101, a quasi co-located (QCL) parameter is determined.

The QCL parameter is configured to indicate a length of a discovery reference signal (DRS) transmission window configured under sub-carrier space adopted by a synchronization signal block (SSB).

In this example, a value of the QCL parameter may be related to the length of the DRS transmission window.

In a first possible embodiment, the value of QCL parameter corresponds to the length of DRS transmission window in a one-to-one mode. According to a length of a DRS transmission window currently adopted by the access network device, the value of QCL parameter is determined by searching for a one-to-one correspondence between the value of the QCL parameter and the length of DRS transmission window.

In a second possible embodiment, for different kinds of SCS, a correspondence between the QCL parameter and the length of the DRS transmission window is configured. In the case of the same SCS, there is a one-to-one or many-to-one relation between the value of the QCL parameter and the length of the DRS transmission window. In the case of two different kinds of SCS, different lengths of the DRS transmission window may correspond to the same value of the same QCL parameter. It is also possible that in the case of two different kinds of SCS, the length of the same DRS transmission window corresponds to the same value of the QCL parameter.

In a third possible embodiment, a correspondence exists between value ranges of the QCL parameter and lengths of the DRS transmission window configured under different kinds of SCS. For example, all candidate values of the QCL parameter are divided into at least two sets, and each set corresponds to a length of a DRS transmission window configured under the SCS. Each set includes at least one value. Further, the value of the QCL parameter may be used to indicate a beam to which the SSB belongs. That is, firstly, according to the length of the DRS transmission window configured under the SCS, the value range of QCL parameter is determined, and then within this value range, the value of the QCL parameter corresponding to the beam to which SSB belongs is further determined, for example, an SSB candidate position index modulo the QCL parameter gets a corresponding beam.

It should be noted that with increase of the SCS, the number of the beam increases relative to the number of beams used in the related art, so those skilled in the art may understand that the number of beams indicated by QCL needs to be increased accordingly, and a 2-bit QCL parameter used in the related art may not satisfy an indication requirement, so it is necessary to extend the QCL parameter to at least 3 bits.

Step 102, indication information of the QCL parameter is sent.

In this example, since the length of the DRS transmission window is dynamically or quasi-statically configured by the access network device, the access network device may send the indication information of the QCL parameter to the user equipment, such that the user equipment may determine, according to the indication information of the QCL parameter, the length of the DRS transmission window configured by the access network device.

In the related art, the number of bits occupied by the QCL parameter is 2, which indicates four possible values of {1, 2, 4, 8}. In this example, the QCL parameter needs to be extended by at least one bit, such that the number of bits occupied by the QCL parameter becomes 3 bits, producing more possible values of the QCL parameter. It is certain that the 2 bits occupied by the QCL parameter in the related art may also be used together with any other appropriate bit or character field.

Those skilled in the art may conceive that the number of bits occupied by QCL parameters may be further extended, such that the QCL parameter occupies more bits, indicating more possibilities. In this example, the number of bits occupied by the QCL parameter is not limited, and the following description will be made by taking the QCL parameter occupying 3 bits as an example, which does not constitute limitation to this example. Those skilled in the art may conceive that the QCL parameter with more bits may be used.

In a possible embodiment, the access network device sends the SSB to the user equipment, and a PBCH of the SSB carries the indication information of the QCL parameter. The indication information may exist in a payload of the PBCH. Some bits in the payload are occupied to serve as the indication information of the QCL parameter.

The PBCH payload includes two parts, that is, a master information block (MIB) payload, totaling 24 bits, and a payload, totaling 8 bits and including low-order 4-bit system frame number (SFN), 1-bit half-frame indication, and 3-bit SSB candidate position index. MIB payload information includes a system frame number, sub-carrier space, SSB-sub-carrier offset (Kssb), a demodulation reference signal (DMRS) type A position, SIB1 physical downlink control channel (PDCCH) configuration, and whether the cell prohibits access, co-frequency reselection and 1-bit reservation.

For example, 1-bit sub-carrier space and 2 bits of the Kssb may be used in the PBCH payload as the indication information of the QCL parameter. The Kssb occupies 4 bits totally in the PBCH, and lower-order 2 bits in the Kssb or middle or higher-order 2 bits in the Kssb may be occupied as the indication information of the QCL parameter, or 2 bits at a middle interval in the Kssb may be occupied as the indication information of the QCL parameter. In this example, a position of bit occupation in the Kssb is not limited.

Again, for example, 3 bits in the Kssb may be used in the PBCH payload as the indication information of the QCL parameter. The Kssb occupies 4 bits totally in the PBCH, and lower-order 3 bits in the Kssb or higher-order 3 bits in the Kssb may be occupied as the indication information of the QCL parameter, or 3 bits at a middle interval of the Kssb may be occupied as the indication information of the QCL parameter. In this example, a position of bit occupation in the Kssb is not limited.

In another possible embodiment, the access network device sends high-level signaling to the user equipment, the high-level signaling carries configuration information of a transmission configuration indication (TCI) state, and the configuration information of the TCI state may include the indication information of the QCL parameter.

In this example, the access network device configures the length of the DRS transmission window in different scenarios, the QCL parameter is determined according to the length of the DRS transmission window, and then the access network device sends the QCL parameter to the user equipment, such that more possible DRS transmission windows may be used for communication between the access network device and the user equipment, an SSB candidate position is convenient to set in the DRS transmission window for listen before talk based on the SSB candidate position in an unlicensed frequency band, and the SSB is sent at an SSB candidate position determined idle.

Figure 2:
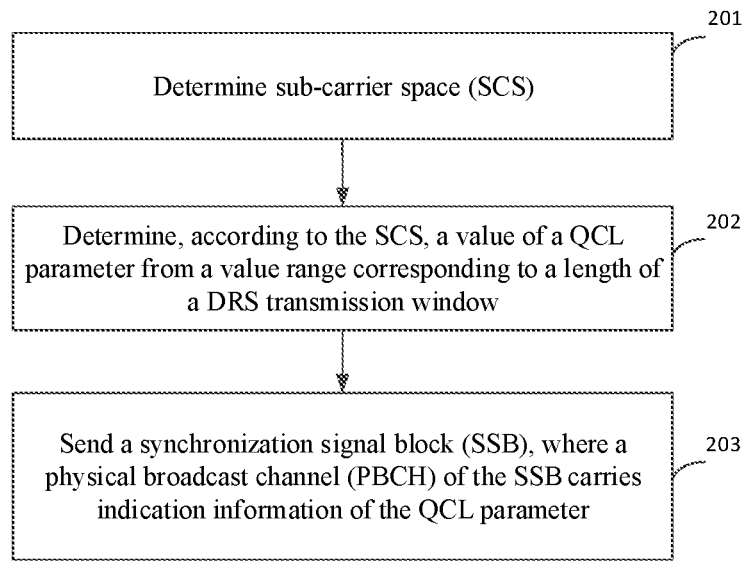
FIG. 2 is a schematic flowchart of another information transmission method according to an example of the disclosure.

FIG. 2 is a schematic flowchart of another information transmission method according to an example of the disclosure, and the method according to this example is executed by an access network device.

The information transmission method includes:

Step 201, SCS is determined.

The SCS may be configured as 120 KHz, 240 KHz, 480 KHz, and peak 960 KHz. In the related art, these kinds of SCS may correspond to case D, case E and case F respectively as follows:

the SCS corresponds to case D when configured as 120 KHz; and/or
the SCS corresponds to case E when configured as 240 KHz; and/or
the SCS corresponds to case F when configured as 480 KHz.

It should be noted that the above correspondences may exist independently, or two or more correspondences may be supported at the same time, and any two correspondences are in a relation of and/or.

In the following steps, these cases will be discussed separately.

Step 202, a value of a QCL parameter is determined from a value range corresponding to a length of a DRS transmission window according to the SCS.

The value of the QCL parameter may equal at least one of {0, 1, 2, 4, 8, 16, 32, 64}, and the value of the QCL is determined according to the beam to which the SSB belongs, the SCS and the length of the DRS transmission window, such that the user equipment may determine the beam to which the SSB belongs and/or the length of the DRS transmission window according to the value of the QCL, and a more flexible configuration mode is implemented. In this example, the value range, such as {0} or {1, 2, 4, 8, 16, 32, 64}, corresponding to the SCS and the length of the DRS transmission window may be determined first, and then a specific value may be determined within this range.

In a first possible embodiment, corresponding to case D, the SCS equals 120 KHz, the length of the DRS transmission window equals 10 ms, and a corresponding value of the QCL parameter includes 0. The value of the QCL parameter equals a positive number in the related art, such as one of {1, 2, 4, 8}, and a specific value may be determined according to the beam to which the SSB belongs. By setting the value of the QCL parameter as zero, the user equipment may determine the length of the DRS transmission window to be 10 ms after learning the QCL parameter and combining the SCS of 120 KHz. In the related art, the length of the DRS transmission window is 5 ms, but since the DRS transmission window is fully occupied, no SSB candidate transmission position, that is, SSB candidate position, is reserved. In this example, corresponding to case D, the length of the DRS transmission window of 10 ms is obtained by prolonging by 5 ms on the basis of the original 5 ms. At least 5 ms in the 10 ms DRS transmission window may be set as the SSB candidate position. A specific SSB candidate position may be indicated by the SSB index in the PDCH or by other fields, which is not limited in this example.

In a second possible embodiment, corresponding to case D, the SCS is 120 KHz, the length of the DRS transmission window is 5 ms, a corresponding value of the QCL parameter includes a positive number, such as one of {1, 2, 4, 8, 16, 32, 64}, and a specific value may be determined according to the beam to which the SSB belongs. In the case that the SCS is 120 KHz, a length of the DRS transmission window is 5 ms, the DRS transmission window is fully occupied in the related art, no SSB candidate transmission position, that is, SSB candidate position, is reserved. This embodiment has limited use scenarios, and is suitable for scenarios with fewer interference sources such as factories in order to obtain better communication quality in unlicensed frequency bands. In addition, it should be noted that in a high frequency band, an effect of listen before talk (LBT) is not obvious in some cases, so a solution mentioned in this embodiment that the SCS is 120 KHz, the length of the DRS transmission window is 5 ms, and the SSB candidate position is not configured may be used. In a scenario with an obvious LBT effect, a solution to be introduced later that the SCS of 240 kHz is used for configuring the SSB candidate position, that is, a third possible embodiment is used.

In a third possible embodiment, corresponding to case E, the SCS is 240 KHz, the length of the DRS transmission window is 5 ms, a corresponding value of the QCL parameter includes a positive number, such as one of {1, 2, 4, 8, 16, 32, 64}, and a specific value may be determined according to the beam to which the SSB belongs. In this example, corresponding to case E, the original length of the DRS transmission window of 5 ms is maintained. In this 5 ms DRS transmission window, the SSB candidate position is reserved. A specific SSB candidate position may be indicated by the SSB index in the PDCH or by other fields, which is not limited in this example.

In a fourth possible embodiment, corresponding to case F, the SCS equals 480 KHz, the length of the DRS transmission window is 2.5 ms, and a corresponding value of the QCL parameter includes 0. The value of the QCL parameter equals a positive number in the related art, such as one of {1, 2, 4, 8}, and a specific value may be determined according to the beam to which the SSB belongs. By setting the value of the QCL parameter as zero, the user equipment may determine the length of the DRS transmission window to be 2.5 ms after learning the QCL parameter and combining the SCS of 480 KHz. Although the DRS transmission window is shortened, the SSB candidate position may still be reserved. A specific SSB candidate position may be indicated by the SSB index in the PDCH or by other fields, which is not limited in this example.

In a fifth possible embodiment, corresponding to case F, the SCS is 480 KHz, the length of the DRS transmission window is 5 ms, a corresponding value of the QCL parameter includes a positive number, such as one of {1, 2, 4, 8, 16, 32, 64}, and a specific value may be determined according to the beam to which the SSB belongs. In this example, corresponding to case F, the original length of the DRS transmission window of 5 ms is maintained. In this 5 ms DRS transmission window, the SSB candidate position is reserved. A specific SSB candidate position may be indicated by the SSB index in the PDCH or by other fields, which is not limited in this example.

It should be noted that a DRS period is related to the length of the DRS transmission window, the length of the DRS transmission window is a minimum DRS period, and the DRS period may be an integer multiple of the length of the DRS transmission window. For example, if the length of the DRS transmission window is 5 ms, the DRS period may be 5 ms, 10 ms, 15 ms or 20 ms. Again, for example, if the length of the DRS transmission window is 10 ms, the DRS period may be 10 ms, 20 ms or 30 ms. Again, for example, if the length of the DRS transmission window is 2.5 ms, the DRS period may be 2.5 ms, 5 ms or 7.5 ms.

Step 203, synchronization signal block (SSB) is sent where the SSB carries indication information of the QCL parameter.

In some examples, a physical broadcast channel (PBCH) of the SSB carries the indication information of the QCL parameter.

In this example, since the length of the DRS transmission window is dynamically configured by the access network device, the access network device may send the indication information of the QCL parameter to the user equipment, such that the user equipment may determine, according to the indication information of the QCL parameter, the length of the DRS transmission window configured by the access network device.

In the related art, the number of bits occupied by the QCL parameter is 2, which indicates four possible values of {1, 2, 4, 8}. In this example, the QCL parameter needs to be extended by one bit, such that the number of bits occupied by the QCL parameter becomes 3 bits, and the value of the QCL parameter may be extended to at least one of set {0, 1, 2, 4, 8, 16, 32, 64}.

Those skilled in the art may conceive that the number of bits occupied by QCL parameters may be further extended, such that the QCL parameter occupies more bits, indicating more possibilities. In this example, the number of bits occupied by the QCL parameter is not limited, and the following description will be made by taking the QCL parameter occupying 3 bits as an example, which does not constitute limitation to this example. Those skilled in the art may conceive that the QCL parameter with more bits may be used.

In an example, the access network device sends the SSB to the user equipment, and a PBCH of the SSB carries the indication information of the QCL parameter. The indication information may exist in a payload of the PBCH. Some bits in the payload are occupied to serve as the indication information of the QCL parameter.

The PBCH payload includes two parts, that is, a master information block (MIB) payload, totaling 24 bits, and a payload, totaling 8 bits and including low-order 4-bit system frame number (SFN), 1-bit half-frame indication, and 3-bit SSB candidate position index. MIB payload information includes a system frame number, sub-carrier space, SSB-sub-carrier offset (Kssb), a demodulation reference signal (DMRS) type A (type A) position, SIB1 physical downlink control channel (PDCCH) configuration, and whether the cell prohibits access, co-frequency reselection and 1-bit reservation.

For example, 1-bit sub-carrier space and 2 bits of the Kssb may be used in the PBCH payload as the indication information of the QCL parameter. The Kssb occupies 4 bits totally in the PBCH, and lower-order 2 bits in the Kssb or middle or higher-order 2 bits in the Kssb may be occupied as the indication information of the QCL parameter, or 2 bits at a middle interval in the Kssb may be occupied as the indication information of the QCL parameter. In this example, a position of bit occupation in the Kssb is not limited.

Again, for example, 3 bits in the Kssb may be used in the PBCH payload as the indication information of the QCL parameter. The Kssb occupies 4 bits totally in the PBCH, and lower-order 3 bits in the Kssb or higher-order 3 bits in the Kssb may be occupied as the indication information of the QCL parameter, or 3 bits at a middle interval of the Kssb may be occupied as the indication information of the QCL parameter. In this example, a position of bit occupation in the Kssb is not limited.

In this example, the access network device configures the length of the DRS transmission window in different scenarios, the QCL parameter is determined according to the length of the DRS transmission window, and then the access network device sends the QCL parameter to the user equipment, such that more possible DRS transmission windows may be used for communication between the access network device and the user equipment, an SSB candidate position is convenient to set in the DRS transmission window for listen before talk based on the SSB candidate position in an unlicensed frequency band, and the SSB is sent at an SSB candidate position determined idle.

Figure 3:
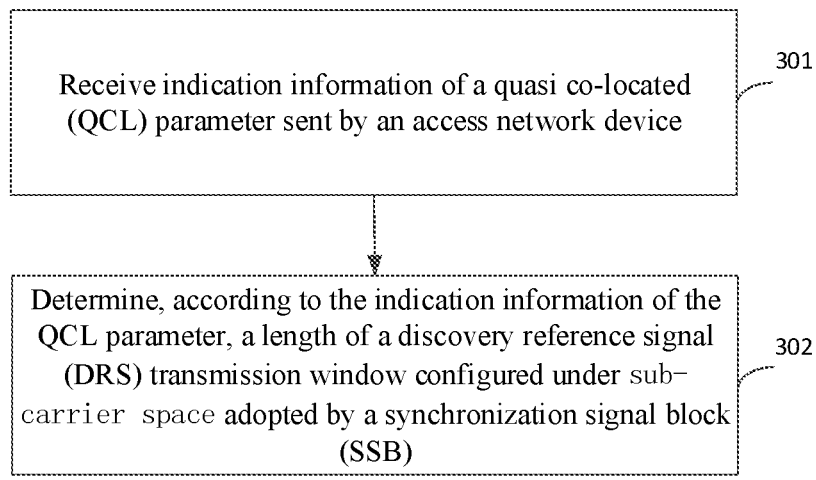
FIG. 3 is a schematic flowchart of still another information transmission method according to an example of the disclosure.

FIG. 3 is a schematic flowchart of still another information transmission method according to an example of the disclosure, and the method according to this example is executed by user equipment.

The user equipment may be scattered throughout a mobile communication system, and each piece of user equipment may be stationary or mobile. The user equipment may also be referred to by those skilled in the art as a mobile station, a subscriber station, a mobile unit, a subscriber unit, a radio unit, a remote unit, a mobile device, user equipment, a radio device, a radio communication device, a remote device, a mobile subscriber station, an access user device, a mobile user device, a radio user device, a remote user device, a handheld device, a user agent, a mobile client, a client or some other appropriate terms. The user equipment may be a cellular phone, a personal digital assistant (PDA), a radio modem, a radio communication device, a handheld device, a tablet computer, a laptop computer, a cordless phone, a wireless local loop (WLL) station, etc. The user equipment may communicate with the access network device in the mobile communication system. With the increase of traffic, especially in some urban areas, a licensed frequency band may not satisfy the demand of traffic easily, so in the related art, the unlicensed frequency band is used for data transmission between the access network device and the user equipment, so as to satisfy greater traffic demand.

The unlicensed frequency band is a frequency band divided, by the country and regions, to be used for radio device communication. This frequency band is usually considered as a shared frequency band, that is, communication devices in different communication systems may use this frequency band as long as the communication devices satisfy regulatory requirements on this frequency band set by the country or regions, and there is no need to apply for exclusive frequency band authorization to the government. The unlicensed frequency band may also be referred to by those skilled in the art as a shared frequency band, an unlicensed frequency spectrum, a license-free frequency band, a license-free frequency spectrum, a shared frequency band, a freely-licensed frequency band, a freely-licensed frequency spectrum or some other appropriate terms.

The information transmission method shown in FIG. 3 is used in an unlicensed frequency band, and the method includes:

Step 301, indication information of a quasi co-located (QCL) parameter sent by an access network device is received.

In this example, a length of a DRS transmission window is dynamically or quasi-statically configured by the access network device, a beam to which an SSB belongs is dynamically determined, the access network device may send the indication information of the QCL parameter to the user equipment, such that the user equipment may determine, according to the indication information of the QCL parameter, the length of the DRS transmission window configured by the access network device.

In the related art, the number of bits occupied by the QCL parameter is 2, which indicates four possible values of {1, 2, 4, 8}. In this example, the QCL parameter needs to be extended by one bit, such that the number of bits occupied by the QCL parameter becomes 3 bits, producing more possible values of the QCL parameter.

Those skilled in the art may conceive that the number of bits occupied by QCL parameters may be further extended, such that the QCL parameter occupies more bits, indicating more possibilities. In this example, the number of bits occupied by the QCL parameter is not limited, and the following description will be made by taking the QCL parameter occupying 3 bits as an example, which does not constitute limitation to this example. Those skilled in the art may conceive that the QCL parameter with more bits may be used.

In a possible embodiment, the user equipment receives the SSB, so as to obtain the indication information of the QCL parameter. The access network device sends the SSB to the user equipment, and a PBCH of the SSB carries the indication information of the QCL parameter. The indication information may exist in a payload of the PBCH. Some bits in the payload are occupied to serve as the indication information of the QCL parameter.

The PBCH payload includes two parts, that is, a master information block (MIB) payload, totaling 24 bits, and a payload, totaling 8 bits and including low-order 4-bit system frame number (SFN), 1-bit half-frame indication, and 3-bit SSB candidate position index. MIB payload information includes a system frame number, sub-carrier space, SSBsub-carrier offset (Kssb), a demodulation reference signal (DMRS) type A position, SIB 1 physical downlink control channel (PDCCH) configuration, and whether the cell prohibits access, co-frequency reselection and 1-bit reservation.

For example, 1-bit sub-carrier space and 2 bits of the Kssb may be used in the PBCH payload as the indication information of the QCL parameter. The Kssb occupies 4 bits totally in the PBCH, and lower-order 2 bits in the Kssb or middle or higher-order 2 bits in the Kssb may be occupied as the indication information of the QCL parameter, or 2 bits at a middle interval in the Kssb may be occupied as the indication information of the QCL parameter. In this example, a position of bit occupation in the Kssb is not limited.

Again, for example, 3 bits in the Kssb may be used in the PBCH payload as the indication information of the QCL parameter. The Kssb occupies 4 bits totally in the PBCH, and lower-order 3 bits in the Kssb or higher-order 3 bits in the Kssb may be occupied as the indication information of the QCL parameter, or 3 bits at a middle interval of the Kssb may be occupied as the indication information of the QCL parameter. In this example, a position of bit occupation in the Kssb is not limited.

In another possible embodiment, the user equipment receives high-level signaling sent by the access network device, the high-level signaling carries configuration information of a transmission configuration indication (TCI) state, and the configuration information of the TCI state may include the indication information of the QCL parameter.

Step 302, a length of a discovery reference signal (DRS) transmission window configured under sub-carrier space adopted by a synchronization signal block (SSB) is determined according to the indication information of the QCL parameter.

In this example, a value of the QCL parameter may be related to the length of the DRS transmission window.

In a first possible embodiment, the value of QCL parameter corresponds to the length of DRS transmission window in a one-to-one mode. According to the value of QCL parameter, a length of a DRS transmission window currently adopted by the access network device is determined by searching for a one-to-one correspondence between the value of the QCL parameter and the length of DRS transmission window.

In a second possible embodiment, for different kinds of SCS, a correspondence between the QCL parameter and the length of the DRS transmission window is configured. In the case of the same SCS, there is a one-to-one or many-to-one relation between the value of the QCL parameter and the length of the DRS transmission window. In the case of two different kinds of SCS, different lengths of the DRS transmission window may correspond to the same value of the same QCL parameter. It is also possible that in the case of two different kinds of SCS, the length of the same DRS transmission window corresponds to the same value of the QCL parameter.

In a third possible embodiment, a correspondence exists between value ranges of the QCL parameter and lengths of the DRS transmission window configured under different kinds of SCS. For example, all candidate values of the QCL parameter are divided into at least two sets, and each set corresponds to a length of a DRS transmission window configured under the SCS. Each set includes at least one value. Further, the value of the QCL parameter may be used to indicate a beam to which the SSB belongs. That is, firstly, according to the length of the DRS transmission window configured under the SCS, the value range of QCL parameter is determined, and then within this value range, the value of the QCL parameter corresponding to the beam to which SSB belongs is further determined, for example, an SSB candidate position index modulo the QCL parameter gets a corresponding beam.

It should be noted that with increase of the SCS, the number of the beam increases relative to the number of beams used in the related art, so those skilled in the art may understand that the number of beams indicated by QCL needs to be increased accordingly, and a 2-bit QCL parameter used in the related art may not satisfy an indication requirement, so it is necessary to extend the QCL parameter to at least 3 bits.

In this example, the access network device configures the length of the DRS transmission window in different scenarios, the QCL parameter is determined according to the length of the DRS transmission window, and then the access network device sends the QCL parameter to the user equipment, such that more possible DRS transmission windows may be used for communication between the access network device and the user equipment, an SSB candidate position is convenient to set in the DRS transmission window for listen before talk based on the SSB candidate position in an unlicensed frequency band, and the SSB is sent at an SSB candidate position determined idle.

Figure 4:
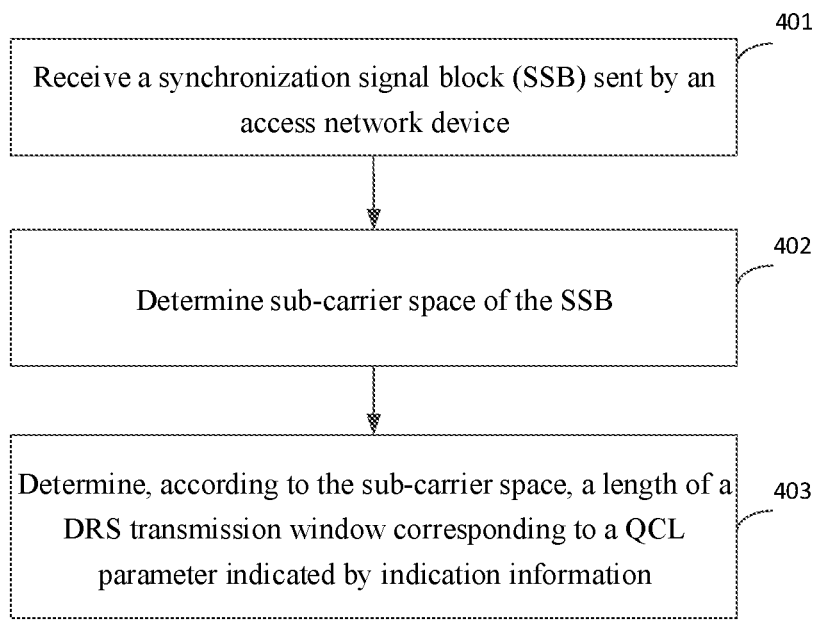
FIG. 4 is a schematic flowchart of still another information transmission method according to an example of the disclosure.

FIG. 4 is a schematic flowchart of still another information transmission method according to an example of the disclosure, and the method according to this example is executed by user equipment.

The information transmission method includes:

Step 401, a synchronization signal block (SSB) sent by an access network device is received.

The SSB carries indication information of the QCL parameter.

In this example, the length of the DRS transmission window is dynamically configured by the access network device, and the access network device may send the indication information of the QCL parameter to the user equipment, such that the user equipment may determine, according to the indication information of the QCL parameter, the length of the DRS transmission window configured by the access network device, and a beam to which the SSB belongs may be further known.

In the related art, the number of bits occupied by the QCL parameter is 2, which indicates four possible values of $\{1, 2, 4, 8\}$. In this example, the QCL parameter needs to be extended by one bit, such that the number of bits occupied by the QCL parameter becomes 3 bits, producing more possible values of the QCL parameter.

Those skilled in the art may conceive that the number of bits occupied by QCL parameters may be further extended, such that the QCL parameter occupies more bits, indicating more possibilities. In this example, the number of bits occupied by the QCL parameter is not limited, and the following description will be made by taking the QCL parameter occupying 3 bits as an example, which does not constitute limitation to this example. Those skilled in the art may conceive that the QCL parameter with more bits may be used.

In an example, the user equipment receives the SSB, so as to obtain the indication information of the QCL parameter. The access network device sends the SSB to the user equipment, and a PBCH of the SSB carries the indication information of the QCL parameter. The indication information may exist in a payload of the PBCH. Some bits in the payload are occupied to serve as the indication information of the QCL parameter.

The PBCH payload includes two parts, that is, a master information block (MIB) payload, totaling 24 bits, and a payload, totaling 8 bits and including low-order 4-bit system frame number (SFN), 1-bit half-frame indication, and 3-bit SSB candidate position index. MIB payload information includes a system frame number, sub-carrier space, SSB-sub-carrier offset (Kssb), a demodulation reference signal (DMRS) type A position, SIB1 physical downlink control channel (PDCCH) configuration, and whether the cell prohibits access, co-frequency reselection and 1-bit reservation.

For example, 1-bit sub-carrier space and 2 bits of the Kssb may be used in the PBCH payload as the indication information of the QCL parameter. The Kssb occupies 4 bits totally in the PBCH, and lower-order 2 bits in the Kssb or middle or higher-order 2 bits in the Kssb may be occupied as the indication information of the QCL parameter, or 2 bits at a middle interval in the Kssb may be occupied as the indication information of the QCL parameter. In this example, a position of bit occupation in the Kssb is not limited.

Again, for example, 3 bits in the Kssb may be used in the PBCH payload as the indication information of the QCL parameter. The Kssb occupies 4 bits totally in the PBCH, and lower-order 3 bits in the Kssb or higher-order 3 bits in the Kssb may be occupied as the indication information of the QCL parameter, or 3 bits at a middle interval of the Kssb may be occupied as the indication information of the QCL parameter. In this example, a position of bit occupation in the Kssb is not limited.

Step 402, sub-carrier space of the SSB is determined.

The SCS may be configured as 120 KHz, 240 KHz, 480 KHz, and peak 960 KHz. In the related art, these kinds of SCS may correspond to case D, case E and case F respectively as follows:

the SCS corresponds to case D when configured as 120 KHz; and/or the SCS corresponds to case E when configured as 240 KHz; and/or the SCS corresponds to case F when configured as 480 KHz.

It should be noted that the above correspondences may exist independently, or two or more correspondences may be supported at the same time, and any two correspondences are in a relation of and/or.

In an example, in the case that occupation of an SCS field of the PBCH payload of the SSB indicates the QCL parameter or other non-SCS meanings, the user equipment may determine the sub-carrier space of the SSB by performing blind detection on the SSB.

In an example, in the case that unoccupation of an SCS field of the PBCH payload of the SSB indicates other non-SCS meanings, that is, the SCS is configured in the PBCH payload, the user equipment may know the sub-carrier space of SSB through the PBCH payload.

Step 403, according to the sub-carrier space, the length of the DRS transmission window corresponding to the QCL parameter indicated by the indication information is determined.

The value of the QCL parameter determined in the above step may equal at least one of set $\{0, 1, 2, 4, 8, 16, 32, 64\}$, and the user equipment may determine the length of the DRS transmission window according to a value range of the value of the QCL parameter, and the SCS, and may further determine the beam to which the SSB belongs according to the value of the QCL parameter, and a more flexible configuration mode is implemented.

In a first possible embodiment, corresponding to case D, the SCS equals 120 KHz, the length of the DRS transmission window equals 10 ms, and a corresponding value of the QCL parameter includes 0. The value of the QCL parameter equals a positive number in the related art, such as one of $\{1, 2, 4, 8\}$. By setting the value of the QCL parameter as zero, the user equipment may determine the length of the DRS transmission window to be 10 ms after learning the QCL parameter and combining the SCS of 120 KHz. In the related art, the length of the DRS transmission window is 5 ms, but since the DRS transmission window is fully occupied, no SSB candidate transmission position, that is, SSB candidate position, is reserved. In this example, corresponding to case D, the length of the DRS transmission window of 10 ms is obtained by prolonging by 5 ms on the basis of the original 5 ms. At least 5 ms in the 10 ms DRS transmission window may be set as the SSB candidate position. A specific SSB candidate position may be indicated by the SSB index in the PDCH or by other fields, which is not limited in this example.

In a second possible embodiment, corresponding to case D, the SCS is 120 KHz, the length of the DRS transmission window is 5 ms, a corresponding value of the QCL parameter includes a positive number, such as one of $\{1, 2, 4, 8, 16, 32, 64\}$, and a specific value may be determined according to the beam to which the SSB belongs. In the case that the SCS is 120 KHz, a length of the DRS transmission window is 5 ms, the DRS transmission window is fully occupied in the related art, no SSB candidate transmission position, that is, SSB candidate position, is reserved. This embodiment has limited use scenarios, and is suitable for scenarios with fewer interference sources such as factories in order to obtain better communication quality in unlicensed frequency bands. In addition, it should be noted that in a high frequency band, an effect of listen before talk (LBT) is not obvious in some cases, so a solution mentioned in this embodiment that the SCS is 120 KHz, the length of the DRS transmission window is 5 ms, and the SSB candidate position is not configured may be used. In a scenario with an obvious LBT effect, a solution to be introduced later that the SCS of 240 kHz is used for configuring the SSB candidate position, that is, a third possible embodiment is used.

In a third possible embodiment, corresponding to case E, the SCS is 240 KHz, the length of the DRS transmission window is 5 ms, a corresponding value of the QCL parameter includes a positive number, such as one of $\{1, 2, 4, 8, 16, 32, 64\}$, and a specific value may be determined according to the beam to which the SSB belongs. In this example, corresponding to case E, the original length of the DRS transmission window of 5 ms is maintained. In this 5 ms DRS transmission window, the SSB candidate position is reserved. A specific SSB candidate position may be indicated by the SSB index in the PDCH or by other fields, which is not limited in this example.

In a fourth possible embodiment, corresponding to case F, the SCS equals 480 KHz, the length of the DRS transmission window is 2.5 ms, and a corresponding value of the QCL parameter includes 0. The value of the QCL parameter equals a positive number in the related art, such as one of $\{1, 2, 4, 8\}$. By setting the value of the QCL parameter as zero, the user equipment may determine the length of the DRS transmission window to be 2.5 ms after learning the QCL parameter and combining the SCS of 480 KHz. Although the DRS transmission window is shortened, the SSB candidate position may still be reserved. A specific SSB candidate position may be indicated by the SSB index in the PDCH or by other fields, which is not limited in this example.

In a fifth possible embodiment, corresponding to case F, the SCS is 480 KHz, the length of the DRS transmission window is 5 ms, a corresponding value of the QCL parameter includes a positive number, such as one of {1, 2, 4, 8, 16, 32, 64}, and a specific value may be determined according to the beam to which the SSB belongs. In this example, corresponding to case F, the original length of the DRS transmission window of 5 ms is maintained. In this 5 candidate position may be indicated by the SSB index in the PDCH or by other fields, which is not limited in this example.

It should be noted that a DRS period is related to the length of the DRS transmission window, the length of the DRS transmission window is a minimum DRS period, and the DRS period may be an integer multiple of the length of the DRS transmission window. For example, if the length of the DRS transmission window is 5 ms, the DRS period may be 5 ms, 10 ms, 15 ms or 20 ms. Again, for example, if the length of the DRS transmission window is 10 ms, the DRS period may be 10 ms, 20 ms or 30 ms. Again, for example, if the length of the DRS transmission window is 2.5 ms, the DRS period may be 2.5 ms, 5 ms or 7.5 ms.

In this example, the access network device configures the length of the DRS transmission window in different scenarios, the QCL parameter is determined according to the length of the DRS transmission window, and then the access network device sends the QCL parameter to the user equipment, such that more possible DRS transmission windows may be used for communication between the access network device and the user equipment, an SSB candidate position is convenient to set in the DRS transmission window for listen before talk based on the SSB candidate position in an unlicensed frequency band, and the SSB is sent at an SSB candidate position determined idle.

Corresponding to the information transmission methods according to the several examples above, the disclosure further provides an information transmission apparatus. Since the information transmission apparatus according to this example of the disclosure corresponds to the methods according to the several examples above, the embodiments of the information transmission method are also applicable to the information transmission apparatus according to this example, and will not be described in detail in this example.

Figure 5:
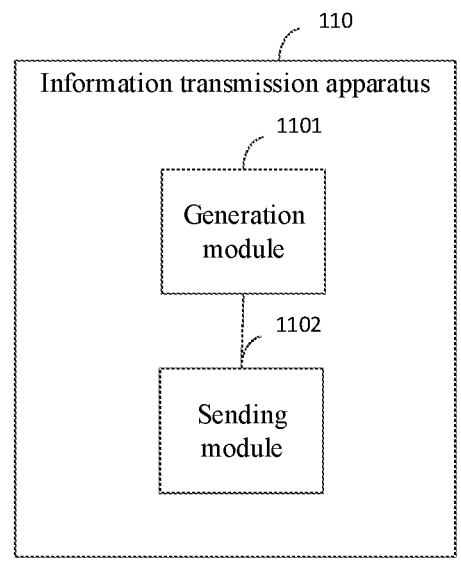
FIG. 5 is a schematic structural diagram of an information transmission apparatus 110 according to an example of the disclosure.

FIG. 5 is a schematic structural diagram of an information transmission apparatus 110 according to an example of the disclosure. The apparatus is applied to an access network device.

With reference to FIG. 5, the information transmission apparatus 110 includes: a generation module 1101 and a sending module 1102.

The generation module 1101 is configured to determine a quasi co-located (QCL) parameter, where the QCL parameter is configured to indicate a length of a discovery reference signal (DRS) transmission window configured under sub-carrier space adopted by a synchronization signal block (SSB).

In this example, a value of the QCL parameter may be related to the length of the DRS transmission window.

In a first possible embodiment, the value of QCL parameter corresponds to the length of DRS transmission window in a one-to-one mode. According to a length of a DRS transmission window currently adopted by the access network device, the value of QCL parameter is determined by searching for a one-to-one correspondence between the value of the QCL parameter and the length of DRS transmission window.

In a second possible embodiment, for different kinds of SCS, a correspondence between the QCL parameter and the length of the DRS transmission window is configured. In the case of the same SCS, the value of the QCL parameter corresponds to the length of the DRS transmission window in a one-to-one mode. In the case of two different kinds of SCS, different lengths of the DRS transmission window may correspond to the same value of the same QCL parameter. It is also possible that in the case of two different kinds of SCS, the length of the same DRS transmission window corresponds to the same value of the QCL parameter.

In a third possible embodiment, a correspondence exists between value ranges of the QCL parameter and lengths of the DRS transmission window configured under different kinds of SCS. For example, all candidate values of the QCL parameter are divided into at least two sets, and each set corresponds to a length of a DRS transmission window configured under the SCS. Each set includes at least one value. Further, the value of the QCL parameter may indicate a beam to which the SSB belongs. That is, firstly, according to the length of the DRS transmission window configured under the SCS, the value range of QCL parameter is determined, and then within this value range, the value of the QCL parameter corresponding to the beam to which SSB belongs is further determined, for example, an SSB candidate position index modulo the QCL parameter gets a corresponding beam.

It should be noted that with increase of the SCS, the number of the beam increases relative to the number of beams used in the related art, so those skilled in the art may understand that the number of beams indicated by QCL needs to be increased accordingly, and a 2-bit QCL parameter used in the related art may not satisfy an indication requirement, so it is necessary to extend the QCL parameter to at least 3 bits.

A sending module 1102 is configured to send indication information of the QCL parameter.

In this example, since a length of a DRS transmission window is dynamically or quasi-statically configured by the access network device, and a beam to which an SSB belongs is dynamic, the access network device may send the indication information of the QCL parameter to the user equipment, such that the user equipment may determine, according to the indication information of the QCL parameter, the length of the DRS transmission window configured by the access network device.

In the related art, the number of bits occupied by the QCL parameter is 2, which indicates four possible values of {1, 2, 4, 8}. In this example, the QCL parameter needs to be extended by one bit, such that the number of bits occupied by the QCL parameter becomes 3 bits, producing more possible values of the QCL parameter.

Those skilled in the art may conceive that the number of bits occupied by QCL parameters may be further extended, such that the QCL parameter occupies more bits, indicating more possibilities. In this example, the number of bits occupied by the QCL parameter is not limited, and the following description will be made by taking the QCL parameter occupying 3 bits as an example, which does not constitute limitation to this example. Those skilled in the art may conceive that the QCL parameter with more bits may be used.

In a possible embodiment, the access network device sends the SSB to the user equipment, and a PBCH of the SSB carries the indication information of the QCL parameter. The indication information may exist in a payload of the PBCH. Some bits in the payload are occupied to serve as the indication information of the QCL parameter.

The PBCH payload includes two parts, that is, a master information block (MIB) payload, totaling 24 bits, and a payload, totaling 8 bits and including low-order 4-bit system frame number (SFN), 1-bit half-frame indication, and 3-bit SSB candidate position index. MIB payload information includes a system frame number, sub-carrier space, SSB-sub-carrier offset (Kssb), a demodulation reference signal (DMRS) type A position, SIB 1 physical downlink control channel (PDCCH) configuration, and whether the cell prohibits access, co-frequency reselection and 1-bit reservation.

For example, 1-bit sub-carrier space and 2 bits of the Kssb may be used in the PBCH payload as the indication information of the QCL parameter. The Kssb occupies 4 bits totally in the PBCH, and lower-order 2 bits in the Kssb or middle or higher-order 2 bits in the Kssb may be occupied as the indication information of the QCL parameter, or 2 bits at a middle interval in the Kssb may be occupied as the indication information of the QCL parameter. In this example, a position of bit occupation in the Kssb is not limited.

Again, for example, 3 bits in the Kssb may be used in the PBCH payload as the indication information of the QCL parameter. The Kssb occupies 4 bits totally in the PBCH, and lower-order 3 bits in the Kssb or higher-order 3 bits in the Kssb may be occupied as the indication information of the QCL parameter, or 3 bits at a middle interval of the Kssb may be occupied as the indication information of the QCL parameter. In this example, a position of bit occupation in the Kssb is not limited.

In another possible embodiment, the access network device sends high-level signaling to the user equipment, the high-level signaling carries configuration information of a transmission configuration indication (TCI) state, and the configuration information of the TCI state may include the indication information of the QCL parameter.

Figure 6:
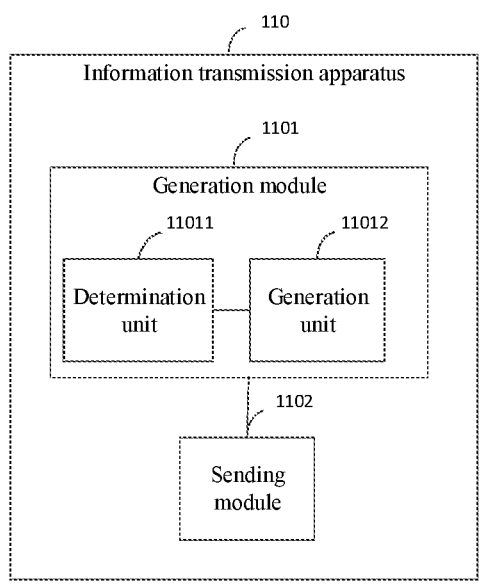
FIG. 6 is a schematic structural diagram of another information transmission apparatus 110 according to an example of the disclosure.

In the example of the disclosure, alternatively, as shown in FIG. 6, the generation module 1101 includes:

A determination unit 11011 is configured to determine sub-carrier space (SCS).

The SCS may be configured as 120 KHz, 240 KHz, 480 KHz, and peak 960 KHz. In the related art, these kinds of SCS may correspond to case D, case E and case F respectively as follows:
- the SCS corresponds to case D when configured as 120 KHz; and/or
- the SCS corresponds to case E when configured as 240 KHz; and/or
- the SCS corresponds to case F when configured as 480 KHz.

It should be noted that the above correspondences may exist independently, or two or more correspondences may be supported at the same time, and any two correspondences are in a relation of and/or.

A generation unit 11012 is configured to determine a value of the QCL parameter from a value range corresponding to the length of the DRS transmission window according to the SCS.

The value of the QCL parameter may equal at least one of set $\{0, 1, 2, 4, 8, 16, 32, 64\}$, and the value of the QCL is determined according to the beam to which the SSB belongs, the SCS, the length of the DRS transmission window, etc., such that the user equipment may determine the beam to which the SSB belongs and/or the length of the DRS transmission window according to the value of the QCL, and a more flexible configuration mode is implemented.

In a first possible embodiment, corresponding to case D, the SCS equals 120 KHz, the length of the DRS transmission window equals 10 ms, and a corresponding value of the QCL parameter includes 0. The value of the QCL parameter equals a positive number in the related art, such as one of $\{1, 2, 4, 8\}$. By setting the value of the QCL parameter as zero, the user equipment may determine the length of the DRS transmission window to be 10 ms after learning the QCL parameter and combining the SCS of 120 KHz. In the related art, the length of the DRS transmission window is 5 ms, but since the DRS transmission window is fully occupied, no SSB candidate transmission position, that is, SSB candidate position, is reserved. In this example, corresponding to case D, the length of the DRS transmission window of 10 ms is obtained by prolonging by 5 ms on the basis of the original 5 ms. At least 5 ms in the 10 ms DRS transmission window may be set as the SSB candidate position. A specific SSB candidate position may be indicated by the SSB index in the PDCH or by other fields, which is not limited in this example.

In a second possible embodiment, corresponding to case D, the SCS is 120 KHz, the length of the DRS transmission window is 5 ms, a corresponding value of the QCL parameter includes a positive number, such as one of $\{1, 2, 4, 8, 16, 32, 64\}$, and a specific value may be determined according to the beam to which the SSB belongs. In the case that the SCS is 120 KHz, a length of the DRS transmission window is 5 ms, the DRS transmission window is fully occupied in the related art, no SSB candidate transmission position, that is, SSB candidate position, is reserved. This embodiment has limited use scenarios, and is suitable for scenarios with fewer interference sources such as factories in order to obtain better communication quality in unlicensed frequency bands. In addition, it should be noted that in a high frequency band, an effect of listen before talk (LBT) is not obvious in some cases, so a solution mentioned in this embodiment that the SCS is 120 KHz, the length of the DRS transmission window is 5 ms, and the SSB candidate position is not configured may be used. In a scenario with an obvious LBT effect, a solution to be introduced later that the SCS of 240 kHz is used for configuring the SSB candidate position, that is, a third possible embodiment is used.

In a third possible embodiment, corresponding to case E, the SCS is 240 KHz, the length of the DRS transmission window is 5 ms, a corresponding value of the QCL parameter includes a positive number, such as one of $\{1, 2, 4, 8, 16, 32, 64\}$, and a specific value may be determined according to the beam to which the SSB belongs. In this example, corresponding to case E, the original length of the DRS transmission window of 5 ms is maintained. In this 5 candidate position may be indicated by the SSB index in the PDCH or by other fields, which is not limited in this example.

In a fourth possible embodiment, corresponding to case F, the SCS equals 480 KHz, the length of the DRS transmission window is 2.5 ms, and a corresponding value of the QCL parameter includes 0. The value of the QCL parameter equals a positive number in the related art, such as one of $\{1, 2, 4, 8\}$, and a specific value may be determined according to the beam to which the SSB belongs. By setting the value of the QCL parameter as zero, the user equipment may determine the length of the DRS transmission window to be 2.5 ms after learning the QCL parameter and combining the SCS of 480 KHz. Although the DRS transmission window is shortened, the SSB candidate position may still be reserved. A specific SSB candidate position may be indicated by the SSB index in the PDCH or by other fields, which is not limited in this example.

In a fifth possible embodiment, corresponding to case F, the SCS is 480 KHz, the length of the DRS transmission window is 5 ms, a corresponding value of the QCL parameter includes a positive number, such as one of {1, 2, 4, 8, 16, 32, 64}, and a specific value may be determined according to the beam to which the SSB belongs. In this example, corresponding to case F, the original length of the DRS transmission window of 5 ms is maintained. In this 5 ms DRS transmission window, the SSB candidate position is reserved. A specific SSB candidate position may be indicated by the SSB index in the PDCH or by other fields, which is not limited in this example.

It should be noted that a DRS period is related to the length of the DRS transmission window, the length of the DRS transmission window is a minimum DRS period, and the DRS period may be an integer multiple of the length of the DRS transmission window. For example, if the length of the DRS transmission window is 5 ms, the DRS period may be 5 ms, 10 ms, 15 ms or 20 ms. Again, for example, if the length of the DRS transmission window is 10 ms, the DRS period may be 10 ms, 20 ms or 30 ms. Again, for example, if the length of the DRS transmission window is 2.5 ms, the DRS period may be 2.5 ms, 5 ms or 7.5 ms.

In this example, the access network device configures the length of the DRS transmission window in different scenarios, the QCL parameter is determined according to the length of the DRS transmission window, and then the access network device sends the QCL parameter to the user equipment, such that more possible DRS transmission windows may be used for communication between the access network device and the user equipment, an SSB candidate position is convenient to set in the DRS transmission window for listen before talk based on the SSB candidate position in an unlicensed frequency band, and the SSB is sent at an SSB candidate position determined idle.

Corresponding to the information transmission methods according to the several examples above, the disclosure further provides an information transmission apparatus. Since the information transmission apparatus according to this example of the disclosure corresponds to the information transmission methods according to the several examples above, the embodiments of the information transmission method are also applicable to the information transmission apparatus according to this example, and will not be described in detail in this example.

Figure 7:
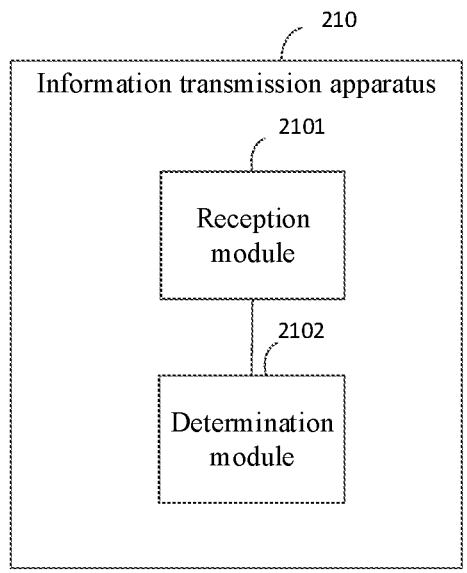
FIG. 7 is a schematic structural diagram of an information transmission apparatus 210 according to an example of the disclosure.

FIG. 7 is a schematic structural diagram of an information transmission apparatus 210 according to an example of the disclosure. The apparatus is applied to user equipment.

As shown in FIG. 7, the information transmission apparatus 210 includes: a reception module 2101 and a determination module 2102.

The reception module 2101 is configured to receive indication information of a quasi co-located (QCL) parameter sent by an access network device.

In this example, the length of the DRS transmission window is dynamically or quasi-statically configured by the access network device, and the access network device may send the indication information of the QCL parameter to the user equipment, such that the user equipment may determine, according to the indication information of the QCL parameter, the length of the DRS transmission window configured by the access network device.

In the related art, the number of bits occupied by the QCL parameter is 2, which indicates four possible values of {1, 2, 4, 8}. In this example, the QCL parameter needs to be extended by one bit, such that the number of bits occupied by the QCL parameter becomes 3 bits, producing more possible values of the QCL parameter.

Those skilled in the art may conceive that the number of bits occupied by QCL parameters may be further extended, such that the QCL parameter occupies more bits, indicating more possibilities. In this example, the number of bits occupied by the QCL parameter is not limited, and the following description will be made by taking the QCL parameter occupying 3 bits as an example, which does not constitute limitation to this example. Those skilled in the art may conceive that the QCL parameter with more bits may be used.

In a possible embodiment, the user equipment receives the SSB, so as to obtain the indication information of the QCL parameter. The access network device sends the SSB to the user equipment, and a PBCH of the SSB carries the indication information of the QCL parameter. The indication information may exist in a payload of the PBCH. Some bits in the payload are occupied to serve as the indication information of the QCL parameter.

The PBCH payload includes two parts, that is, a master information block (MIB) payload, totaling 24 bits, and a payload, totaling 8 bits and including low-order 4-bit system frame number (SFN), 1-bit half-frame indication, and 3-bit SSB candidate position index. MIB payload information includes a system frame number, sub-carrier space, SSB-sub-carrier offset (Kssb), a demodulation reference signal (DMRS) type A position, SIB1 physical downlink control channel (PDCCH) configuration, and whether the cell prohibits access, co-frequency reselection and 1-bit reservation.

For example, 1-bit sub-carrier space and 2 bits of the Kssb may be used in the PBCH payload as the indication information of the QCL parameter. The Kssb occupies 4 bits totally in the PBCH, and lower-order 2 bits in the Kssb or middle or higher-order 2 bits in the Kssb may be occupied as the indication information of the QCL parameter, or 2 bits at a middle interval in the Kssb may be occupied as the indication information of the QCL parameter. In this example, a position of bit occupation in the Kssb is not limited.

Again, for example, 3 bits in the Kssb may be used in the PBCH payload as the indication information of the QCL parameter. The Kssb occupies 4 bits totally in the PBCH, and lower-order 3 bits in the Kssb or higher-order 3 bits in the Kssb may be occupied as the indication information of the QCL parameter, or 3 bits at a middle interval of the Kssb may be occupied as the indication information of the QCL parameter. In this example, a position of bit occupation in the Kssb is not limited.

In another possible embodiment, the user equipment receives high-level signaling sent by the access network device, the high-level signaling carries configuration information of a transmission configuration indication (TCI) state, and the configuration information of the TCI state may include the indication information of the QCL parameter.

The determination module 2102 is configured to determine, according to the indication information of the QCL parameter, a length of a discovery reference signal (DRS) transmission window configured under sub-carrier space adopted by a synchronization signal block (SSB).

In this example, the value of the QCL parameter may be related to the length of the DRS transmission window, or to the beam to which SSB belongs, or to the length of the DRS transmission window and the beam to which SSB belongs.

In a first possible embodiment, the value of QCL parameter corresponds to the length of DRS transmission window in a one-to-one mode. According to the value of QCL parameter, a length of a DRS transmission window currently adopted by the access network device is determined by searching for a one-to-one correspondence between the value of the QCL parameter and the length of DRS transmission window.

In a second possible embodiment, for different kinds of SCS, a correspondence between the QCL parameter and the length of the DRS transmission window is configured. In the case of the same SCS, the value of the QCL parameter corresponds to the length of the DRS transmission window in a one-to-one mode. In the case of two different kinds of SCS, different lengths of the DRS transmission window may correspond to the same value of the same QCL parameter. It is also possible that in the case of two different kinds of SCS, the length of the same DRS transmission window corresponds to the same value of the QCL parameter.

In a third possible embodiment, a correspondence exists between value ranges of the QCL parameter and lengths of the DRS transmission window configured under different kinds of SCS. For example, all candidate values of the QCL parameter are divided into at least two sets, and each set corresponds to a length of a DRS transmission window configured under the SCS. Each set includes at least one value. Further, the value of the QCL parameter may indicate a beam to which the SSB belongs. That is, firstly, according to the length of the DRS transmission window configured under the SCS, the value range of QCL parameter is determined, and then within this value range, the value of the QCL parameter corresponding to the beam to which SSB belongs is further determined, for example, an SSB candidate position index modulo the QCL parameter gets a corresponding beam.

Figure 8:
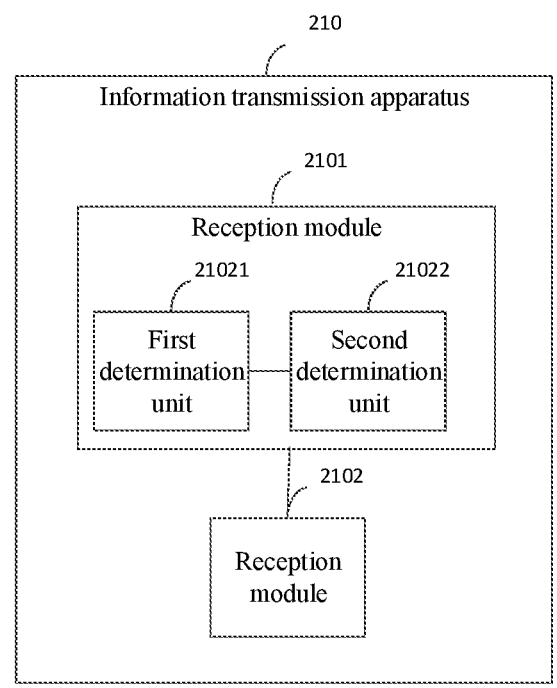
FIG. 8 is a schematic structural diagram of another information transmission apparatus 210 according to an example of the disclosure.

In the example of the disclosure, alternatively, as shown in FIG. 8, the determination module 2102 includes:

A first determination unit 21021 is configured to determine the sub-carrier space of the SSB.

The SCS may be configured as 120 KHz, 240 KHz, 480 KHz, and peak 960 KHz. In the related art, these kinds of SCS may correspond to case D, case E and case F respectively as follows:

the SCS corresponds to case D when configured as 120 KHz; and/or the SCS corresponds to case E when configured as 240 KHz; and/or the SCS corresponds to case F when configured as 480 KHz.

It should be noted that the above correspondences may exist independently, or two or more correspondences may be supported at the same time, and any two correspondences are in a relation of and/or.

In an example, in the case that occupation of an SCS field of the PBCH payload of the SSB indicates the QCL parameter or other non-SCS meanings, the user equipment may determine the sub-carrier space of the SSB by performing blind detection on the SSB.

In an example, in the case that unoccupation of an SCS field of the PBCH payload of the SSB indicates other non-SCS meanings, that is, the SCS is configured in the PBCH payload, the user equipment may know the sub-carrier space of SSB through the PBCH payload.

A second determination unit 21022 is configured to determine, according to the sub-carrier space, the length of the DRS transmission window corresponding to the QCL parameter indicated by the indication information.

The value of the QCL parameter determined may equal at least one of set $\{0, 1, 2, 4, 8, 16, 32, 64\}$, and the user equipment may determine the length of the DRS transmission window according to a value range of the value of the QCL parameter and the SCS, and may further determine the beam to which the SSB belongs according to the value of the QCL parameter, and a more flexible configuration mode is implemented.

In a first possible embodiment, corresponding to case D, the SCS equals 120 KHz, the length of the DRS transmission window equals 10 ms, and a corresponding value of the QCL parameter includes 0. The value of the QCL parameter equals a positive number in the related art, such as one of $\{1, 2, 4, 8\}$. By setting the value of the QCL parameter as zero, the user equipment may determine the length of the DRS transmission window to be 10 ms after learning the QCL parameter and combining the SCS of 120 KHz. In the related art, the length of the DRS transmission window is 5 ms, but since the DRS transmission window is fully occupied, no SSB candidate transmission position, that is, SSB candidate position, is reserved. In this example, corresponding to case D, the length of the DRS transmission window of 10 ms is obtained by prolonging by 5 ms on the basis of the original 5 ms. At least 5 ms in the 10 ms DRS transmission window may be set as the SSB candidate position. A specific SSB candidate position may be indicated by the SSB index in the PDCH or by other fields, which is not limited in this example.

In a second possible embodiment, corresponding to case D, the SCS is 120 KHz, the length of the DRS transmission window is 5 ms, a corresponding value of the QCL parameter includes a positive number, such as one of $\{1, 2, 4, 8, 16, 32, 64\}$, and a specific value may be determined according to the beam to which the SSB belongs. In the case that the SCS is 120 KHz, a length of the DRS transmission window is 5 ms, the DRS transmission window is fully occupied in the related art, no SSB candidate transmission position, that is, SSB candidate position, is reserved. This embodiment has limited use scenarios, and is suitable for scenarios with fewer interference sources such as factories in order to obtain better communication quality in unlicensed frequency bands. In addition, it should be noted that in a high frequency band, an effect of listen before talk (LBT) is not obvious in some cases, so a solution mentioned in this embodiment that the SCS is 120 KHz, the length of the DRS transmission window is 5 ms, and the SSB candidate position is not configured may be used. In a scenario with an obvious LBT effect, a solution to be introduced later that the SCS of 240 kHz is used for configuring the SSB candidate position, that is, a third possible embodiment is used.

In a third possible embodiment, corresponding to case E, the SCS is 240 KHz, the length of the DRS transmission window is 5 ms, a corresponding value of the QCL parameter includes a positive number, such as one of $\{1, 2, 4, 8, 16, 32, 64\}$, and a specific value may be determined according to the beam to which the SSB belongs. In this example, corresponding to case E, the original length of the DRS transmission window of 5 ms is maintained. In this 5 ms DRS transmission window, the SSB candidate position is reserved. A specific SSB candidate position may be indicated by the SSB index in the PDCH or by other fields, which is not limited in this example.

In a fourth possible embodiment, corresponding to case F, the SCS equals 480 KHz, the length of the DRS transmission window is 2.5 ms, and a corresponding value of the QCL parameter includes 0. The value of the QCL parameter equals a positive number in the related art, such as one of {1, 2, 4, 8}. By setting the value of the QCL parameter as zero, the user equipment may determine the length of the DRS transmission window to be 2.5 ms after learning the QCL parameter and combining the SCS of 480 KHz. Although the DRS transmission window is shortened, the SSB candidate position may still be reserved. A specific SSB candidate position may be indicated by the SSB index in the PDCH or by other fields, which is not limited in this example.

In a fifth possible embodiment, corresponding to case F, the SCS is 480 KHz, the length of the DRS transmission window is 5 ms, a corresponding value of the QCL parameter includes a positive number, such as one of {1, 2, 4, 8, 16, 32, 64}, and a specific value may be determined according to the beam to which the SSB belongs. In this example, corresponding to case F, the original length of the DRS transmission window of 5 ms is maintained. In this 5 ms DRS transmission window, the SSB candidate position is reserved. A specific SSB candidate position may be indicated by the SSB index in the PDCH or by other fields, which is not limited in this example.

It should be noted that a DRS period is related to the length of the DRS transmission window, the length of the DRS transmission window is a minimum DRS period, and the DRS period may be an integer multiple of the length of the DRS transmission window. For example, if the length of the DRS transmission window is 5 ms, the DRS period may be 5 ms, 10 ms, 15 ms or 20 ms. Again, for example, if the length of the DRS transmission window is 10 ms, the DRS period may be 10 ms, 20 ms or 30 ms. Again, for example, if the length of the DRS transmission window is 2.5 ms, the DRS period may be 2.5 ms, 5 ms or 7.5 ms.

In this example, the access network device configures the length of the DRS transmission window in different scenarios, the QCL parameter is determined according to the length of the DRS transmission window, and then the access network device sends the QCL parameter to the user equipment, such that more possible DRS transmission windows may be used for communication between the access network device and the user equipment, an SSB candidate position is convenient to set in the DRS transmission window for listen before talk based on the SSB candidate position in an unlicensed frequency band, and the SSB is sent at an SSB candidate position determined idle.

In order to implement the above examples, the disclosure further provides a communication device and a readable storage medium.

The communication device according to the example of the disclosure includes a processor, a transceiver, a memory and an executable program that is stored in the memory and may be run by the processor, where the processor executes a method for determining an available state of a designated reference signal according to any of the foregoing technical solution when running the executable program.

The communication device may be the foregoing access network device or the foregoing user equipment.

The processor may include various storage media, and the storage media are non-transitory computer storage media, and may continue storing information stored on the communication device after a power failure. Here, the communication device includes the access network device or the user equipment.

The processor may be connected to the memory through a bus, etc. for reading the executable program stored on the memory, for example, as shown in at least one of FIGS. 1-2 or FIGS. 3-4.

In order to implement the above examples, the disclosure further provides a computer storage medium.

The computer storage medium according to the example of the disclosure stores an executable programs. After being executed by a processor, the executable program may implement the method for determining an available state of a designated reference signal according to any of the foregoing technical solutions, as shown in at least one of FIGS. 1-2 or FIGS. 3-4.

Figure 9:
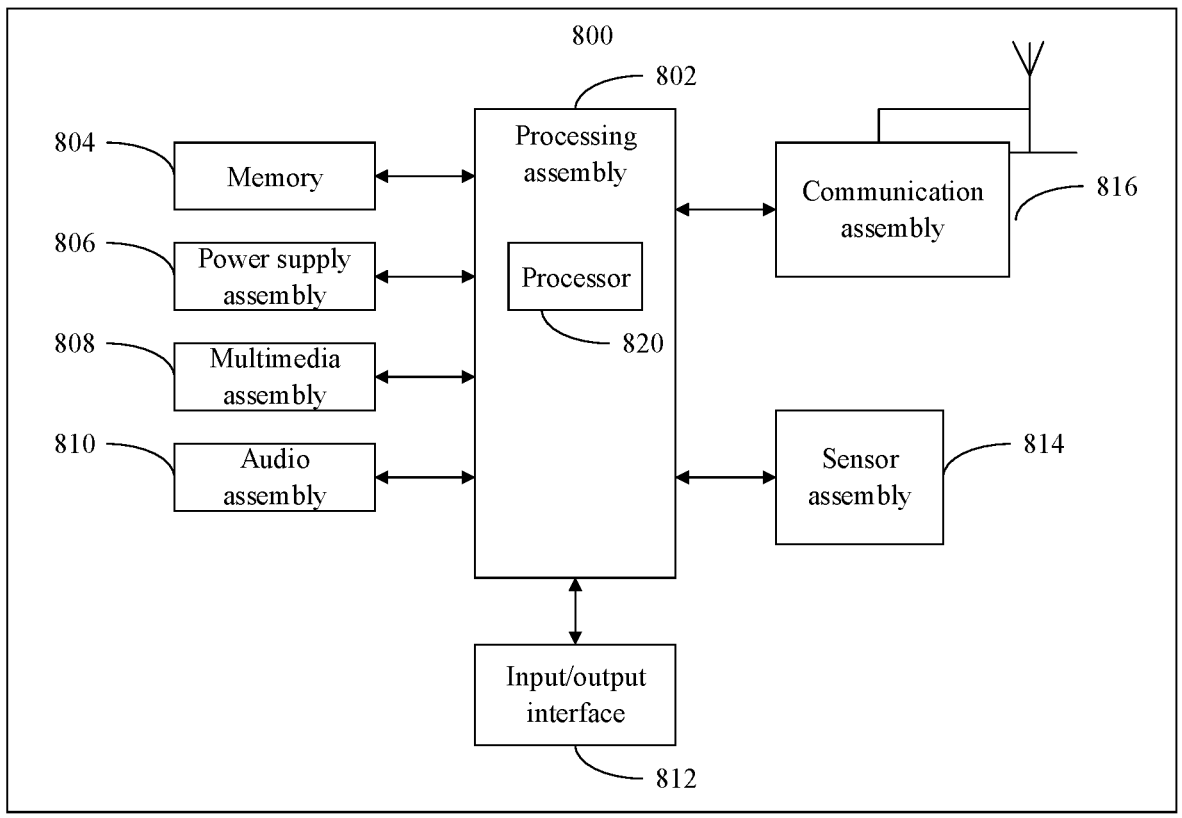
FIG. 9 is a block diagram of UE 800 according to an example of the disclosure.

FIG. 9 is a block diagram of UE 800 according to an example of the disclosure. For example, the UE 800 may be a mobile phone, a computer, digital broadcast user device, a message transceiving device, a game console, a tablet device, a medical device, a fitness device, a personal digital assistant, etc., and is used to execute the method as shown in at least one of FIGS. 3-4.

With reference to FIG. 9, the UE 800 may include at least one of a processing assembly 802, a memory 804, a power supply assembly 806, a multimedia assembly 808, an audio assembly 810, an input/output (I/O) interface 812, a sensor assembly 814, and a communication assembly 816.

The processing assembly 802 controls an overall operation of the UE 800, such as an operation associated with display, a telephone call, data communication, a camera operation, and a recording operation. The processing assembly 802 may include at least one processor 820 to execute an instruction, so as to complete all or some steps of the above method. In addition, the processing assembly 802 may include at least one module to facilitate interaction between the processing assembly 802 and other assemblies. For example, the processing assembly 802 may include a multimedia module to facilitate interaction between the multimedia assembly 808 and the processing assembly 802.

The memory 804 is configured to store various types of data to support the operation of the UE 800. Instances of such data include instructions operated on the UE 800 for any application or method, contact data, phonebook data, messages, pictures, videos, etc. The memory 804 may be implemented by any type of volatile or non-volatile storage device, or their combinations, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 806 energizes various assemblies of the UE 800. The power supply assembly 806 may include a power management system, at least one power supply, and other assemblies associated with power generation, management, and distribution for the UE 800.

The multimedia assembly 808 includes a screen providing an output interface between the UE 800 and a user. In some examples, the screen may include a liquid crystal display (LCD) and a touch panel (TP). If the screen includes the TP, the screen may be implemented as a touch screen to receive an input signal from the user. The TP includes at least one touch sensor to sense touching, swiping, and gestures on the TP. The touch sensor may not merely sense a boundary of a touch or swipe action, but also detect wake-up time and a pressure associated with the touch or swipe operation. In some examples, the multimedia assembly 808 includes a front-facing camera and/or a rear-facing camera. When the UE 800 is in an operation mode, for example, a photographing mode or a video mode, the front-facing camera and/or the rear-facing camera may receive external multimedia data. Each of the front-facing camera and the rear-facing camera may be a fixed optical lens system or have a focal length and an optical zoom capacity.

The audio assembly 810 is configured to output and/or input an audio signal. For example, the audio assembly 810 includes a microphone (MIC) configured to receive an external audio signal when the UE 800 is in the operation mode, such as a call mode, a recording mode, and a speech recognition mode. The received audio signals may be further stored in the memory 804 or transmitted via the communication assembly 816. In some examples, the audio assembly 810 may further include a speaker for outputting audio signals.

The I/O interface 812 provides an interface between the processing assembly 802 and an peripheral interface module that may be a keyboard, a click wheel, a button, etc. These buttons may include, but are not limited to, a home button, a volume button, a start button, and a lock button.

The sensor assembly 814 includes at least one sensor for providing state assessments in various aspects for the UE 800. For example, the sensor assembly 814 may detect an on/off state of the UE 800, and relative positioning of assemblies, for example, the assemblies are a display and a keypad of the UE 800. The sensor assembly 814 may also detect a change in position of the UE 800 or an assembly of the UE 800, presence or absence of contact between the user and the UE 800, orientation or acceleration/deceleration of the UE 800, and temperature change of the UE 800. The sensor assembly 814 may include a proximity sensor configured to detect presence of nearby objects without any physical contact. The sensor assembly 814 may further include an optical sensor, such as a complementary metal-oxide-semiconductor transistor (CMOS) or charge-coupled device (CCD) image sensor, for use in imaging applications. In some examples, the sensor assembly 814 may further include an acceleration sensor, a gyroscope sensor, a magnetic sensor, a pressure sensor, or a temperature sensor.

The communication assembly 816 is configured to facilitate wired or wireless communication between the UE 800 and other devices. The UE 800 may be connected to a wireless network based on a communication standard, such as WiFi, 2G or 3G, or their combinations. In an example, the communication assembly 816 receives a broadcast signal or broadcast related information from an external broadcast management system via a broadcast channel. In an example, the communication assembly 816 further includes a near field communication (NFC) module to promote short-range communication. For example, the NFC module may be implemented on the basis of a radio frequency identification (RFID) technology, an infrared data association (IrDA) technology, an ultra wide band (UWB) technology, a Bluetooth (BT) technology, etc.

In an example, the UE 800 may be implemented by at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements to execute the method above.

In an example, further provided is a non-transitory computer-readable storage medium including an instruction, for example, a memory 804 including an instruction, and the instruction above may be executed by the processor 820 of the UE 800 so as to implement the method above. For example, the non-transitory computer-readable storage medium may be a read-only memory (ROM), a random access memory (RAM), a compact disc read-only memory (CD-ROM), a magnetic tape, a floppy disk, an optical data storage apparatus, etc.

Figure 10:
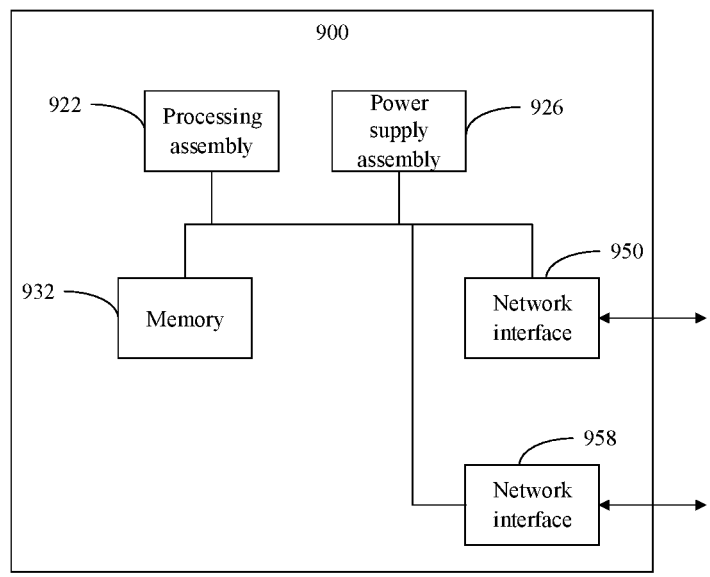
FIG. 10 is a schematic structural diagram of an access network device 900 according to an example of the disclosure.

As shown in FIG. 10, a schematic structural diagram of an access network device 900 according to an example of the disclosure is shown in FIG. 10. For example, with reference to FIG. 10, the access network device 900 includes a processing assembly 922 and further includes at least one processor, and a memory resource represented by a memory 932 for storing instructions, such as applications that may executed by the processing assembly 922. The applications stored in the memory 932 may include one or more modules each corresponding to a set of instructions. In addition, the processing assembly 922 is configured to execute the instructions to execute any method (for example, the method shown in FIG. 1 or 2), applied to the access network device, of the foregoing methods.

The access network device 900 may further include a power supply assembly 926 configured to execute power management of the access network device 900, a wired or wireless network interface 950 configured to network the access network device 900, and an input-output (I/O) interface 958. The access network device 900 may operate an operation system stored in the memory 932, such as Windows Server™, Mac OS X™, Unix™, Linux™ and FreeBSD™.

Those skilled in the art could easily conceive of other implementation solutions of the disclosure upon consideration of the description and the disclosure disclosed here. The disclosure is intended to cover any variation, use or adaptive change of the disclosure, which follows general principles of the disclosure and includes common general knowledge or conventional technical means in the technical field not disclosed in the disclosure. The description and the examples are merely considered illustrative, and a true scope and spirit of the disclosure are indicated by the following claims.

It shall be understood that the disclosure is not limited to precise structures described above and shown in the accompanying drawings, and various modifications and changes can be made without departing from the scope of the disclosure. The scope of the disclosure is merely limited by the appended claims.

An example of a first aspect of the disclosure provides an information transmission method. The information transmission method is performed by an access network device, and includes:

determining a quasi co-located (QCL) parameter, where the QCL parameter is configured to indicate a length of a discovery reference signal (DRS) transmission window configured under sub-carrier space adopted by a synchronization signal block (SSB); and sending indication information, wherein the indication information is configured to indicate the QCL parameter.

In an example, determining a QCL parameter, includes:

determining the sub-carrier space; and determining, according to the sub-carrier space, a value of the QCL parameter from a value range corresponding to the length of the DRS transmission window.

In an example, a value of the QCL parameter equals at least one of {0, 1, 2, 4, 8, 16, 32, 64}.

In an example, the sub-carrier space is 120 KHz, the length of the DRS transmission window is 10 ms, and a corresponding value of the QCL parameter includes 0, the length of the DRS transmission window being a minimum DRS period.

In an example, the sub-carrier space is 120 KHz, the length of the DRS transmission window is 5 ms, and a corresponding value of the QCL parameter includes a positive number, the length of the DRS transmission window being a minimum DRS period.

In an example, the sub-carrier space is 240 KHz, the length of the DRS transmission window is 5 ms, and a corresponding value of the QCL parameter includes a positive number, the length of the DRS transmission window being a minimum DRS period.

In an example, the sub-carrier space is 480 KHz, the length of the DRS transmission window is 2.5 ms, and a corresponding value of the QCL parameter includes 0, the length of the DRS transmission window being a minimum DRS period.

In an example, the sub-carrier space is 480 KHz, the length of the DRS transmission window is 5 ms, and a corresponding value of the QCL parameter includes a positive number, the length of the DRS transmission window being a minimum DRS period.

In an example, an SSB candidate transmission position is set in the DRS transmission window.

In an example, a payload of a physical broadcast channel (PBCH) of the SSB carries the indication information of the QCL parameter.

An example of a second aspect of the disclosure provides an information transmission method. The information transmission method is performed by user equipment, and includes:
  receiving indication information of a quasi co-located (QCL) parameter sent by an access network device; and
  determining, according to the indication information of the QCL parameter, a length of a discovery reference signal (DRS) transmission window configured under sub-carrier space adopted by a synchronization signal block (SSB).

In an example, the determining, according to the indication information of the QCL parameter, a length of a DRS transmission window configured under sub-carrier space adopted by an SSB includes:
  determining the sub-carrier space of the SSB; and
  determining, according to the sub-carrier space, the length of the DRS transmission window corresponding to the QCL parameter indicated by the indication information, and/or a beam to which the SSB belongs.

In an example, a value of the QCL parameter equals at least one of {0, 1, 2, 4, 8, 16, 32, 64}.

In an example, the sub-carrier space is 120 KHz, and a length of the DRS transmission window corresponding to the QCL parameter having a value including 0 is 10 ms, the length of the DRS transmission window being a minimum DRS period.

In an example, the sub-carrier space is 120 KHz, and a length of the DRS transmission window corresponding to the QCL parameter having a value including a positive number is 5 ms, the length of the DRS transmission window being a minimum DRS period.

In an example, the sub-carrier space is 240 KHz, and a length of the DRS transmission window corresponding to the QCL parameter having a value including a positive number is 5 ms, the length of the DRS transmission window being a minimum DRS period.

In an example, the sub-carrier space is 480 KHz, and a length of the DRS transmission window corresponding to the QCL parameter having a value including 0 is 2.5 ms, the length of the DRS transmission window being a minimum DRS period.

In an example, the sub-carrier space is 480 KHz, and a length of the DRS transmission window corresponding to the QCL parameter having a value including a positive number is 5 ms, the length of the DRS transmission window being a minimum DRS period.

In an example, an SSB candidate transmission position is set in the DRS transmission window.

In an example, a payload of a physical broadcast channel (PBCH) of the SSB carries the indication information of the QCL parameter.

An example of a third aspect of the disclosure provides an information transmission apparatus. The information transmission apparatus is applied to an access network device, and includes:
  a generation module configured to determine a quasi co-located (QCL) parameter, where the QCL parameter is configured to indicate a length of a discovery reference signal (DRS) transmission window configured under sub-carrier space adopted by a synchronization signal block (SSB); and
  a sending module configured to send indication information, wherein the indication information is configured to indicate the QCL parameter.

In an example, the generation module includes:
  a determination unit configured to determine sub-carrier space (SCS); and
  a generation unit configured to determine a value of the QCL parameter from a value range corresponding to the length of the DRS transmission window according to the SCS.

An example of a fourth aspect of the disclosure provides an information transmission apparatus. The information transmission apparatus is applied to user equipment, and includes:
  a reception module configured to receive indication information of a quasi co-located (QCL) parameter sent by an access network device; and
  a determination module configured to determine, according to the indication information of the QCL parameter, a length of a discovery reference signal (DRS) transmission window configured under sub-carrier space adopted by a synchronization signal block (SSB).

In an example, determination module includes:
  a first determination unit configured to determine the sub-carrier space of the SSB; and
  a first determination unit configured to determine, according to the sub-carrier space, the length of the DRS transmission window corresponding to the QCL parameter indicated by the indication information, and/or a beam to which the SSB belongs.

The examples of the disclosure provide the information transmission method and apparatus, a communication device and a computer-readable storage medium. The access network device configures the length of the DRS transmission window in different scenarios, the QCL parameter is determined according to the length of the DRS transmission window, and then the access network device sends the QCL parameter to the user equipment, such that more possible DRS transmission windows may be used for communication between the access network device and the user equipment, an SSB candidate position is convenient to set in the DRS transmission window for listen before talk based on the SSB candidate position in an unlicensed frequency band, and an SSB is sent at an SSB candidate position determined idle.

Additional aspects and advantages of the disclosure will be partially set forth in the following description, which will become apparent in the following description, or may be learned by practice of the disclosure.

What is claimed is:

1. An information transmission method, performed by an access network device, and comprising:
   determining a quasi co-located (QCL) parameter, wherein the QCL parameter is configured to indicate a length of a discovery reference signal (DRS) transmission window configured under sub-carrier space adopted by a synchronization signal block (SSB); and
   sending indication information, wherein the indication information is configured to indicate the QCL parameter.

2. The information transmission method according to claim 1, wherein determining a QCL parameter comprises:
   determining the sub-carrier space; and
   determining, according to the sub-carrier space, a value of the QCL parameter from a value range corresponding to the length of the DRS transmission window, wherein the value of the QCL parameter equals at least one of {0, 1, 2, 4, 8, 16, 32, 64}.

3. The information transmission method according to claim 2, wherein
   the sub-carrier space is 120 KHz, the length of the DRS transmission window is 10 ms, and a corresponding value of the QCL parameter comprises 0, the length of the DRS transmission window being a minimum DRS period, and
   an SSB candidate transmission position is set in the DRS transmission window.

4. The information transmission method according to claim 2, wherein
   the sub-carrier space is 120 KHz, the length of the DRS transmission window is 5 ms, and a corresponding value of the QCL parameter comprises a positive number, the length of the DRS transmission window being a minimum DRS period.

5. The information transmission method according to claim 2, wherein
   the sub-carrier space is 240 KHz, the length of the DRS transmission window is 5 ms, and a corresponding value of the QCL parameter comprises a positive number, the length of the DRS transmission window being a minimum DRS period.

6. The information transmission method according to claim 2, wherein
   the sub-carrier space is 480 KHz, the length of the DRS transmission window is 2.5 ms, and a corresponding value of the QCL parameter comprises 0, the length of the DRS transmission window being a minimum DRS period.

7. The information transmission method according to claim 2, wherein
   the sub-carrier space is 480 KHz, the length of the DRS transmission window is 5 ms, and a corresponding value of the QCL parameter comprises a positive number, the length of the DRS transmission window being a minimum DRS period.

8. The information transmission method according to claim 1, wherein a payload of a physical broadcast channel (PBCH) of the SSB carries the indication information of the QCL parameter.

9. An information transmission method, performed by user equipment, and comprising:
   receiving indication information of a quasi co-located (QCL) parameter sent by an access network device; and
   determining, according to the indication information of the QCL parameter, a length of a discovery reference signal (DRS) transmission window configured under sub-carrier space adopted by a synchronization signal block (SSB).

10. The information transmission method according to claim 9, wherein determining, according to the indication information of the QCL parameter, a length of a DRS transmission window configured under sub-carrier space adopted by an SSB comprises:
    determining the sub-carrier space of the SSB; and
    determining, according to the sub-carrier space, the length of the DRS transmission window corresponding to the QCL parameter indicated by the indication information, wherein
    a value of the QCL parameter equals at least one of {0, 1, 2, 4, 8, 16, 32, 64}.

11. The information transmission method according to claim 10, wherein
    the sub-carrier space is 120 KHz, and a length of the DRS transmission window corresponding to the QCL parameter having a value comprising 0 is 10 ms, the length of the DRS transmission window being a minimum DRS period, and
    an SSB candidate transmission position is set in the DRS transmission window.

12. The information transmission method according to claim 10, wherein
    the sub-carrier space is 120 KHz, and a length of the DRS transmission window corresponding to the QCL parameter having a value comprising a positive number is 5 ms, the length of the DRS transmission window being a minimum DRS period.

13. The information transmission method according to claim 10, wherein
    the sub-carrier space is 240 KHz, and a length of the DRS transmission window corresponding to the QCL parameter having a value comprising a positive number is 5 ms, the length of the DRS transmission window being a minimum DRS period.

14. The information transmission method according to claim 10, wherein
    the sub-carrier space is 480 KHz, and a length of the DRS transmission window corresponding to the QCL parameter having a value comprising 0 is 2.5 ms, the length of the DRS transmission window being a minimum DRS period.

15. The information transmission method according to claim 10, wherein
    the sub-carrier space is 480 KHz, and a length of the DRS transmission window corresponding to the QCL parameter having a value comprising a positive number is 5 ms, the length of the DRS transmission window being a minimum DRS period.

16. The information transmission method according to claim 9, wherein a payload of a physical broadcast channel (PBCH) of the SSB carries the indication information of the QCL parameter.

17. A communication device, comprising: a transceiver; a memory; and a processor that is connected to the transceiver and the memory separately, is configured to control radio signal transmission and reception by the transceiver by executing a computer-executable instruction on the memory, and can implement a method comprising:

determining a quasi co-located (OCL) parameter, wherein the QCL parameter is configured to indicate a length of a discovery reference signal (DRS) transmission window configured under sub-carrier space adopted by a synchronization signal block (SSB); sending indication information, wherein the indication information is configured to indicate the QCL parameter.

18. A computer storage medium, storing a computer-executable instruction, wherein the computer-executable instruction can implement the information transmission method according to claim 1 after being executed by a processor.

19. A communication device, comprising: a transceiver; a memory; and a processor that is connected to the transceiver and the memory separately, is configured to control radio signal transmission and reception by the transceiver by executing a computer-executable instruction on the memory, and can implement the information transmission method of claim 9.

20. A computer storage medium, storing a computer-executable instruction, wherein the computer-executable instruction can implement the information transmission method according to claim 9 after being executed by a processor.

* * * * *